United States Patent [19]

McGrouther

[11] Patent Number: 5,788,795
[45] Date of Patent: Aug. 4, 1998

[54] APPARATUS FOR COLD LAMINATING RIGID PLASTICS AND STATIONERY

[75] Inventor: David Alexander McGrouther, Bearsden, United Kingdom

[73] Assignee: Plastisign Limited of Unit 6, Glasgow, Scotland

[21] Appl. No.: 757,487

[22] Filed: Nov. 27, 1996

Related U.S. Application Data

[63] Continuation of Ser. No. 343,529, filed as PCT/GB93/01093, May 26, 1993 published as WO93/24325, Dec. 9, 1993, abandoned.

[30] Foreign Application Priority Data

May 27, 1992 [GB] United Kingdom ............... 9211169
Mar. 13, 1993 [GB] United Kingdom ............... 9305184

[51] Int. Cl.[6] .................................................. B32B 31/00
[52] U.S. Cl. ......................... 156/249; 156/254; 156/517; 156/521; 156/555
[58] Field of Search .......................... 156/254, 257, 156/513, 517, 521, 555, 556, 580, 582, 249

[56] References Cited

U.S. PATENT DOCUMENTS

| 3,132,581 | 5/1964 | Isbey et al. ............... 156/254 X |
| 3,380,869 | 4/1968 | Hochner ..................... 156/230 X |
| 3,451,872 | 6/1969 | Townsend ................... 156/254 |
| 3,492,182 | 1/1970 | Howard ...................... 156/582 X |
| 3,685,420 | 8/1972 | Stievenart et al. ........ 156/230 X |
| 3,836,414 | 9/1974 | Staats ......................... 156/87 |
| 4,188,256 | 2/1980 | Schwab ...................... 156/386 X |
| 4,310,376 | 1/1982 | Ebina et al. .............. 156/580 X |
| 4,767,390 | 8/1988 | Herring ..................... 156/582 X |

FOREIGN PATENT DOCUMENTS

| 0 253 532 | 1/1988 | European Pat. Off. . |
| 4441332 | 5/1995 | Germany . |
| 19509689 | 9/1995 | Germany . |
| 19613614 | 11/1996 | Germany . |
| 4-68500 | 4/1992 | Japan . |
| 6-32154 | 6/1994 | Japan . |

OTHER PUBLICATIONS

Webster's Ninth New Collegiate Dictionary, pp. 70, 992, 1990.

PCT International Search Report dated Dec. 3, 1993—For PCT Application No. PCT/GB93/01093.

Primary Examiner—David A. Simmons
Assistant Examiner—Paul M. Rivard
Attorney, Agent, or Firm—Ratner & Prestia

[57] ABSTRACT

An apparatus and method are provided for laminating a sheet of printed matter to a plastics sheet by removing a small portion of an adhesive protecting cover sheet from the plastics sheet, adhering a portion of the sheet of printed matter to the exposed plastics sheets, removing the remainder of the cover sheet from the plastic sheet, and then adhering the plastics sheet and the printed matter sheet together using apparatus comprising two rollers and a guard for separating the sheets prior to combining the sheets between the rollers.

9 Claims, 5 Drawing Sheets

APPARATUS FOR COLD LAMINATING RIGID PLASTICS AND STATIONERY

This application is a continuation of application Ser. No. 08/343,529, filed as PCT/GB93/01093, May 26, 1993 published as WO93/24325, Dec. 9, 1993, now abandoned.

This invention relates to a method of manufacture of signs, Registration Plates and other articles where it is desired to combine printed matter with a rigid plastics sheet.

It is often required to combine printed matter with a plastics sheets or covering for the purposes of improving aesthetic appearance and protecting the printed matter from tearing, dampness, spoiling and the like. The addition of a plastics component is often useful for preserving printed matter and improving the presentation thereof.

In the past it has been known to provide a plastics flexible sheet for encapsulating printed matter. A sheet of printed matter would be placed within a plastics wallet made from an adhesive sheet which is heat activated. While this process has been found useful in certain applications, there are a number of commercial situations where problems may arise with the use of this process. For example, some printing techniques involve the application of heat for the production of letters or symbols on heat sensitive paper or board and thus the further application of heat when laminating or encapsulating the printed matter in a plastics material generally causes complications. It is also more desirable on occasions to laminate the printed matter rather than encapsulate it, and to use rigid sheeting rather than a flexible plastics material.

Methods used for combining a rigid plastics sheet with printed matter have also been associated with problems in the past and have largely been manual operations seen to be clumsy in comparison with techniques used in other fields. For example, in the production of Licence Plates, the registration number is firstly printed on a board and then rolled in combination with a plastics rigid sheet through two metal rollers compressing and adhering the layers together. With this technique it is also required to pass a blanket type material between the rollers simultaneously to ensure the two laminated layers adhere evenly. In this invention it is realised that mis-alignment of the two layers may easily result, there being little control of the two layers once the rolling action has commenced.

Additionally, in the production of signs, the mounting of certificates and so on it has been common to simply apply a transparent adhesive to one side of a plastics sheet and subsequently attempt to adhere the printed sign or certificate to the plastics sheet without bubbling or buckling of the printed matter. Again, this was found to be a cumbersome and often difficult process. Nevertheless, rigid plastics sheeting is often provided with a transparent adhesive on one or both faces thereof, the adhesive being protected by a peel-off paper cover. Problems arise when attempting to peel off this paper cover and replace same in correct alignment with the appropriate sheet of printed matter without causing bubbles or creases therein. As an alternative, printing has been done directly onto the plastics sheets, normally by means of a form of silk screen printing. However, this is an expensive technique not suited to frequent variation of the printed matter. It is realised in the invention that there is a commercial need to be able to produce rigid laminated signs and/or printed matter in batch quantities, quickly and in accordance with individual and variable requirements.

According to one aspect of the invention there is provided a method for laminating a sheet of printed matter to a plastics sheet comprising removing a small portion of an adhesive protecting cover sheet from the plastics sheet, adhering a portion of the sheet of printed matter to the exposed plastics sheet, removing the remainder of the cover sheet from the plastics sheet and then rolling the plastics sheet together with the sheet of printed matter through rollers so as to cause adherence of the two sheets.

According to a second aspect of the invention there is provided apparatus for enabling adherence of a plastics sheet with a sheet of printed matter, comprising two rollers being spaced apart by the thickness of the laminated combination of the plastics sheet and sheet of printed matter, means of rotating at least one of said rollers, feeding means for feeding said plastics sheet and said sheet of printed matter in combination through the rollers, wherein said feeding means ensures the respective sheets are combined in correct alignment and not allowed to come in contact with each other until such time as they are correctly aligned.

Preferably, said feeding means includes a guard for separating the sheet of printed matter from the plastics sheet prior to combining them between said rollers.

Preferably, said plastics sheet is rigid.

Also according to the second aspect of the invention there is provided a tool for use in tearing a strip from an end of a sheet of paper or plastics, wherein said tool is T-shaped having a leg member connected and perpendicularly disposed to a head member, said leg member having two parallel cutting edges to enable the tool to be used conveniently by both right and left handed operators.

Preferably, the leg member is at least 220 mm long.

Preferably, the head member includes cut out portions at the respective corners made between the ends of the head member and the edge of the head member closest to the leg member and the head member extends longitudinally from each said edge of the leg member by a distance equal to a predetermined optimum width of the strip to be removed.

Alternatively, the head member includes cut out portions located at the edge of the head member closest to the leg member and at a distance from the respective edge of the leg member equivalent to the predetermined optimum width of the strip to be removed.

Preferably, said cut out portion has a profile adapted to provide a pointer means which, when pointed at the closest top corner of said sheet, causes the upper cutting edge to be at the predetermined location of the tear.

Preferably, said leg member comprises a recessed trough adapted to provide a finger gripping means for the operator when using the alignment tool.

According to a third aspect of the invention there is provided a method of producing licence plates for displaying variable information, said method comprising a database for receiving and compiling input information relating to a licence to be issued, determining required data output for said licence and producing a sheet of printed matter in accordance with said data and laminating said sheet of printed matter to a rigid plastics sheet by the method described in the first aspect of the invention.

In order to more clearly disclose the invention, the following examples are now described with reference to the accompanying drawings, in which.

Figure 4:
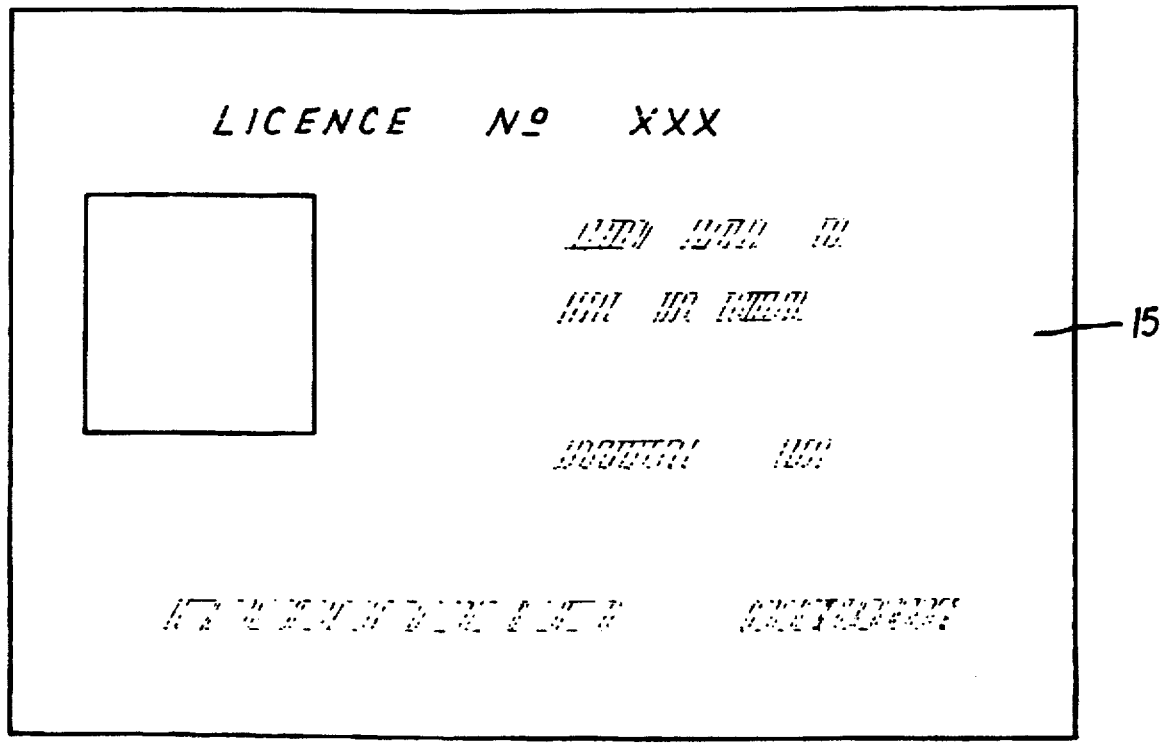
FIG. 4 shows a licence plate having variable information printed thereon.

It is commonly required to produce laminated plastic signs or registration plates as shown, for example, in FIG. 4. In the invention, an improved method of manufacturing and/or producing these is provided as follows.

Firstly, a rigid plastics sheet 1 is obtained, upon which is to be laminated a sheet of printed matter 2. The rigid plastics sheet 1 is preferably provided pre-coated with a transparent adhesive. This adhesive is protected by a cover sheet 3 on at least one side of the rigid plastics sheet 1. It is desired to replace the cover sheet 3 with the sheet of printed matter 2 in correct alignment and without bubbling or creasing of the printed sheet 2.

Figure 2:
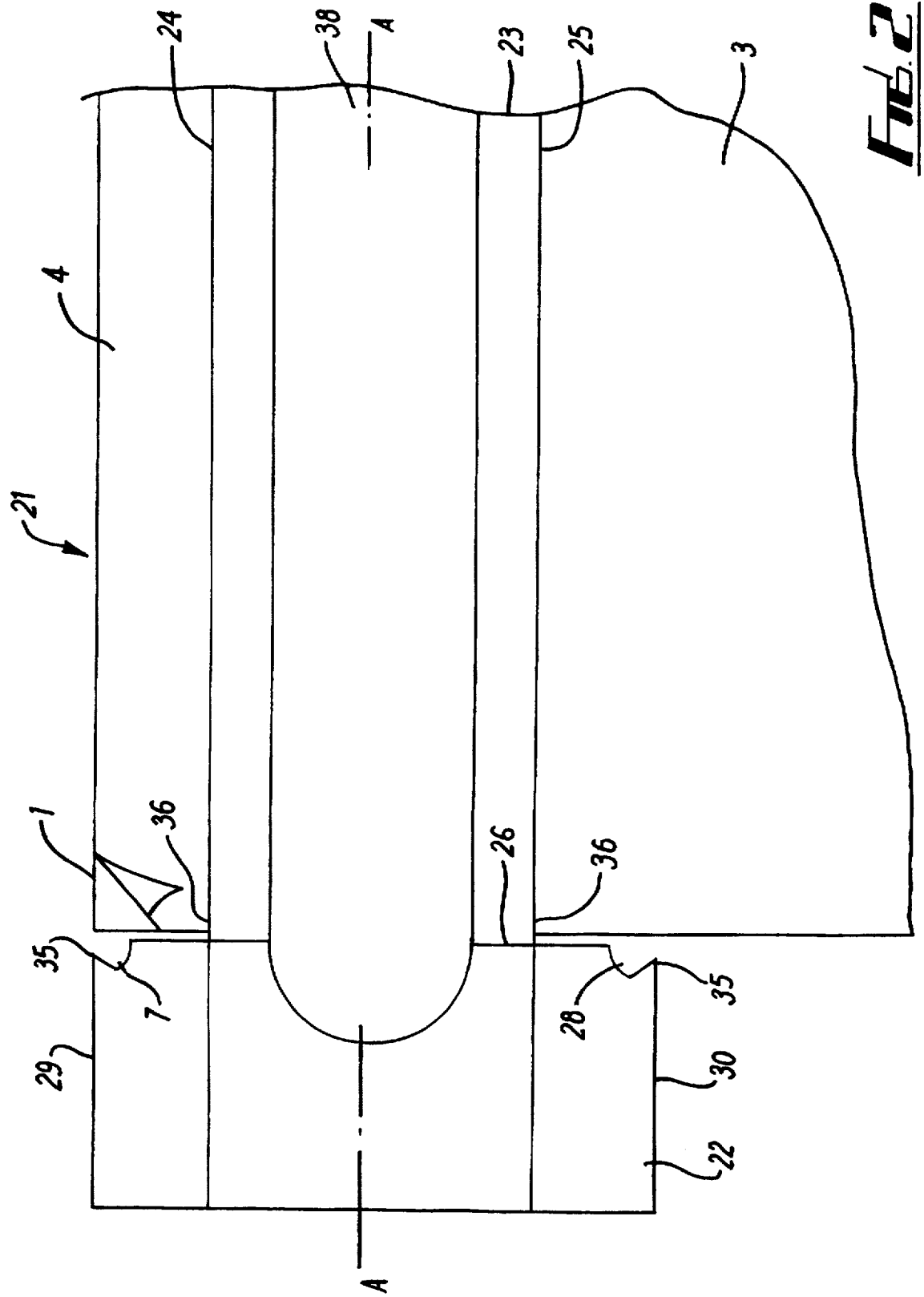
FIG. 2 is a plan view of a stripper tool in accordance with the invention.

In order to do this, a small strip 4 of the cover sheet 3 is removed from the rigid plastics sheet 1. The small strip 4 is preferably only approximately 20–30 mm wide and removed from an area adjacent to one edge 7 of the plastics sheet 1. A tool 21 as shown in FIG. 2 may be used for this purpose. The first step of this method, namely removing a small portion of the adhesive protecting cover sheet is extremely important. If the removed strip 4 is too narrow an insufficient portion of the printed matter sheet can be adhered to the plastics sheet before being passed through the rollers and this is likely to lead to the two sheets not being properly aligned. On the other hand, if the removed strip is unnecessarily large, there is a greater chance of the printed sheet having room to bubble or crease during the manual adherence of the two sheets together before rolling. It is of course desirable to use the parallel and appropriately spaced apart rollers of the mangle for bringing the sheets together, over as much of the area as possible.

Figure 3:
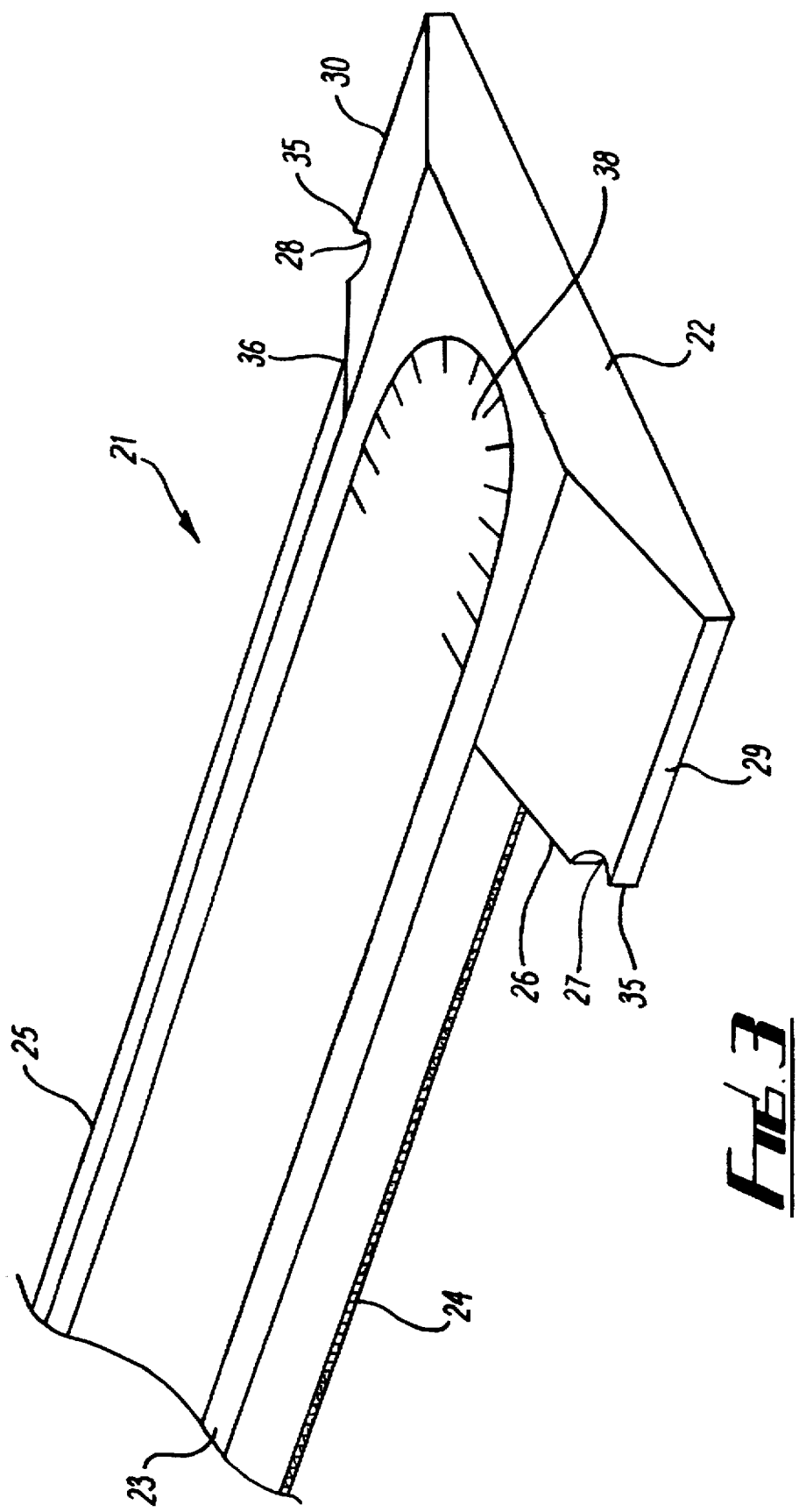
FIG. 3 is a pictorial view of the stripper tool shown in FIG. 2.

Referring to FIGS. 2 and 3, a stripper tool, generally described at 21, comprises a head member 22 and a leg member 23.

The leg member includes two parallel sides or edges, referenced 24 and 25. Each side is provided with a cutting means, which in the embodiment shown is in the form of a tooth edge.

The head member 22 is perpendicular to the leg member 23. The head member 22 comprises cut out portions 27, 28 in the corners located at the intersection of the respective ends 29, 30 of the head member and the side 26 of the head member 22 closest to the leg member 23. The cut out portions 27, 28 provide "pick points" which assist the operator or user in being able to freely use his or her finger to pick the corner of the strip 4 of the cover sheet 3 off the rigid plastics sheet 1.

The tool 21 assists the operator in tearing a strip 4 off the layer 3, wherein the strip 4 is of a predetermined and optimum width for performing the task of, say, laminating a printed sheet on a rigid plastics sheet 1.

It has been found that the optimum width of the strip 4 for this purpose is approximately 20 mm. Accordingly, in a preferred embodiment of the invention the head member 22 extends by a distance of approximately 20 mm from outwith each respective edge 24, 25 of the leg member 23. Thus, by aligning the edge 29 of the head member 22 with the top of the protective cover layer 3, a predetermined or optimum width of strip 4 may be torn using the cerated cutting edge 24 along the upper side of the leg member 23. To assist in the aligning of the tool 21 in this way, the cut out portions 27, 28 have a profile adapted to provide a pointer 35 integral with the ends 29, 30 of the head member 22. The pointer means 35 provides assistance to the operator in aligning the appropriate position of the head member 22 with the top of the cover layer 3.

The tool shown in FIGS. 2 and 3 may be used with equal convenience by a left handed operator or a right handed operator. This is achieved by designing the tool 21 such that it is mirror imaged about a central axis running longitudinally throughout the leg member 23. This axis is referenced in FIG. 2 by the line AA.

Similarly, the invention may be conveniently used for the common sizes A4 or A3 sheets. The length of the leg member 23 is preferably at least 220 mm which is sufficient to extend across the width of an A4 sheet. In cases where an A3 sheet is sought to be used, the head piece 22 of the tool 21 may be aligned on the left hand side of the sheet and used for tearing half the width of the A3 sheet, and then the tool may be placed with the head piece adjacent to the right hand side of the sheet and the remainder of the strip may be then torn. Similarly, any sheet having a width of less than two times the length of the cutting edges of the leg member may be torn by this method. This facility is enabled through the provision of a cutting edge located on both the upper and lower sides of the leg member 3.

The protective layer 3 is frequently made from polythene and silicon treated papers, which have a tendency to stretch when pulled. It is therefore vital to puncture or rupture the layer 14 as soon as possible to facilitate tearing. For this reason the first tooth 36 on each cutting edge 24, 25 is located as near as possible to the side 26 of the head member 22, and preferably only 1 mm from the side 26.

A preferred embodiment of the tool also includes a recessed longitudinal trough 38 which extends into the head member 22. The trough 38 encourages the operator to position his finger or thumb at the place at which maximum pressure should be applied to effect a clean tear.

Figure 5:
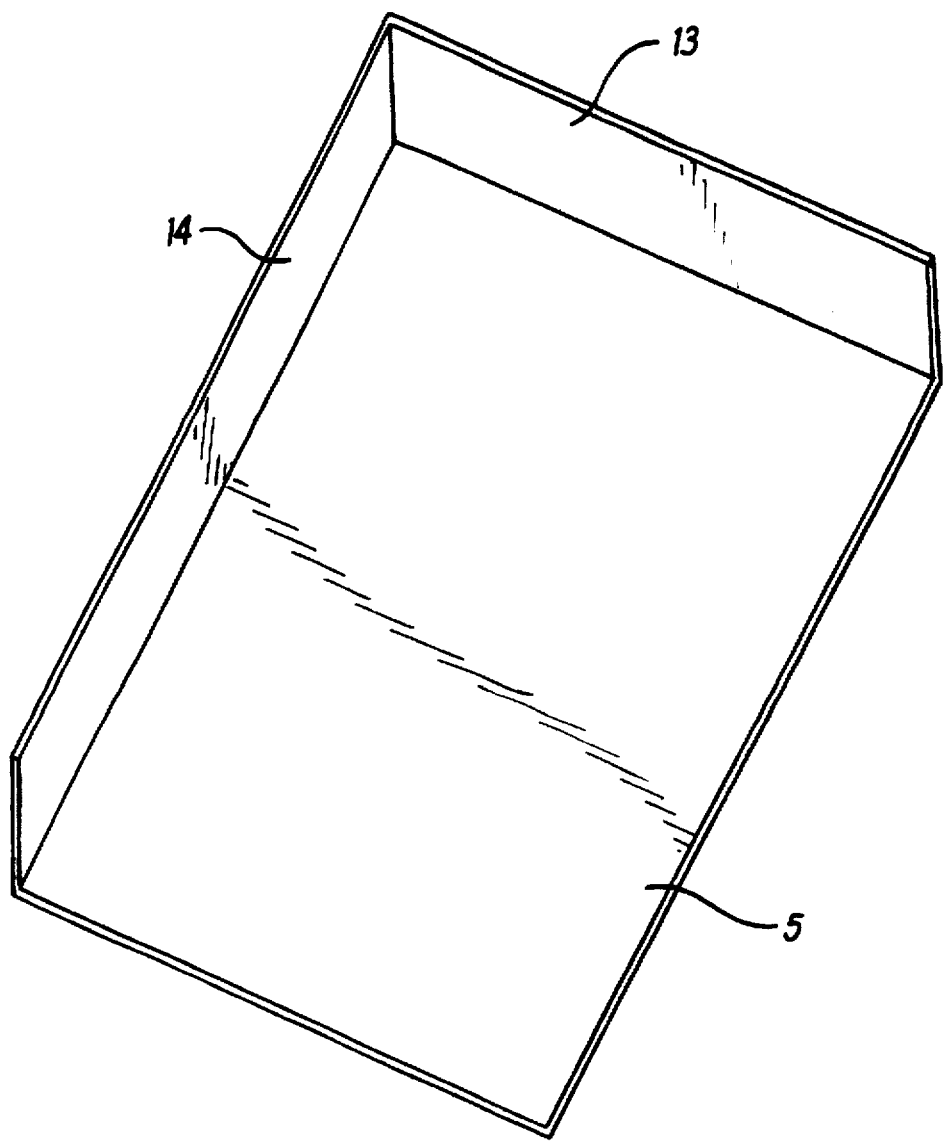
FIG. 5 is a frame used to ensure correct alignment of layers to be laminated.

Following this, the sheet of printed matter 2 is adhered to the plastics sheet 1 in the area where the adhesive is exposed. A frame 5 as shown in FIG. 5 may be incorporated to ensure correct alignment of the printed sheet 2 with the plastics sheet 1. As most of the plastics sheet 1 is still protected by the cover sheet 3, there is no risk of other parts of the printed sheet undesirably sticking to the plastics sheet 1 in a wrong location or alignment.

Figure 1:
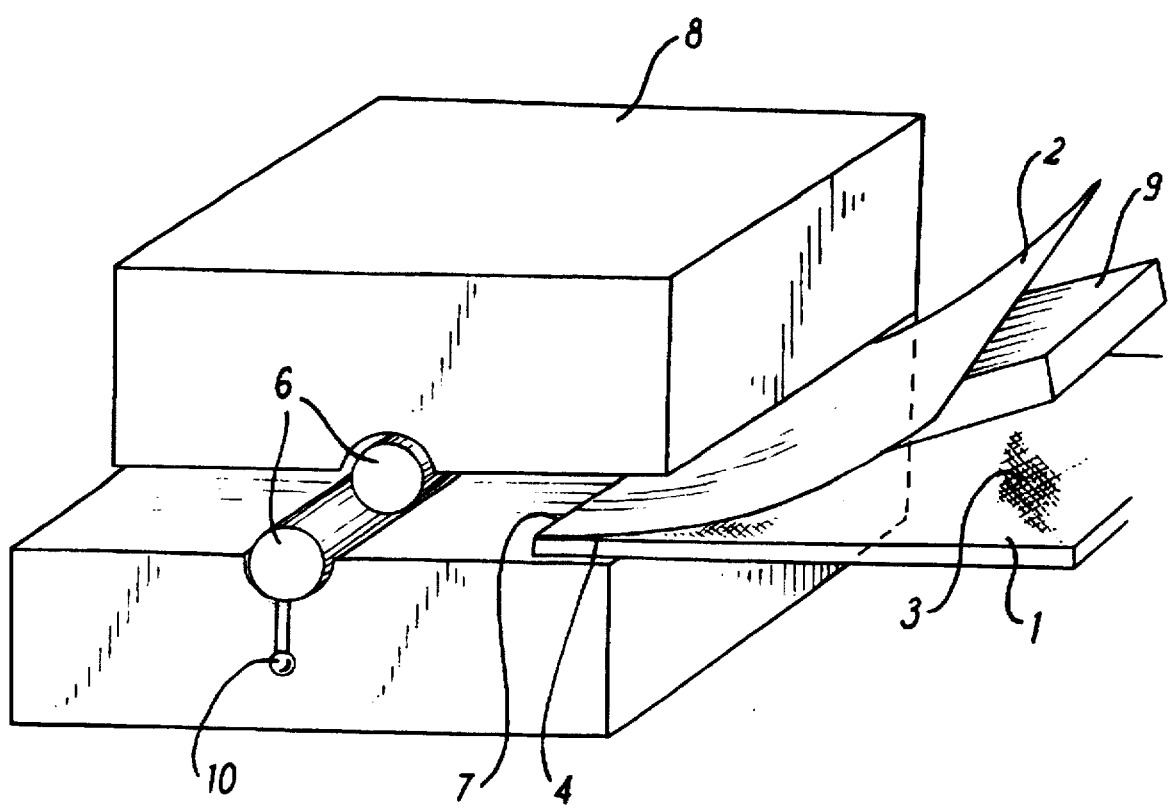
FIG. 1 is a pictorial view of apparatus used for cold rolling a rigid plastics sheet together with a sheet of printed matter to effect lamination thereof.

Once a portion of the printed sheet has been adhered to the plastics sheet 1 in the area adjacent to one edge 7, the edge 7 is fed between two rollers 6 as shown in the apparatus 8 of FIG. 1. A guard 9 provided with the apparatus 8 separates the printed sheet 2 from the plastics sheet 1 ensuring that the two do not come into contact until they are fed evenly through the rollers 6. By reason of this separation, it is safe at this point to remove the remainder of the cover sheet 3 from the plastics sheet 1. Subsequently, by rotating at least one of the rollers 6 by means of the handle 10 the two respective sheets 1, 2 are fed evenly through the space between the rollers 6 adhering to each other in the process. Using this method the two sheets are laminated evenly without bubbles or buckling being produced between them.

While not essential to the invention, further apparatus may be utilized to assist in this process. Firstly, as mentioned hereinbefore a tool 21 comprising a serrated edge 22 may be useful for removing the first small strip 4 of cover sheet 3. Secondly, the frame 5 may be used to ensure correct alignment of the sheet of printed matter 2 with the plastics sheet 1. The two sides 13, 14 of the frame provide a perpendicular surface against which the sheets may be abutted. Thirdly, a computer database (not shown) may be provided for assisting in the determination in the actual content of the printed matter. The latter of these has a particular applicability in the production of Licence and or Registration Plates 15, as shown in FIG. 4.

Where it is required to issue new licenses, for example in the private vehicle hire trade, or to renew existing licences, it is often also useful to produce corresponding licence plates. It is envisaged that with appropriate computer software, information relating to the licence (or vehicle which is to be licensed) may be entered into a said database, from which suitable output data may be generated for display on the licence plates or the like. The database is adapted to communicate with a printer which, as instructed, prints the variable licence information on to a sheet by a method such as is disclosed in this specification.

Further modifications and/or improvements are possible without departing from the scope and spirit of the invention herein intended.

I claim:

1. Apparatus for enabling adherence of a plastics sheet with a sheet of printed matter, wherein said plastics sheet has an applied adhesive protected by a cover sheet, comprising;

an alignment device having a planar base and two wall surfaces extending from two adjacent and perpendicular edges of said planar base, said two wall surfaces aiding correct registration or alignment of at least two respective edges of the plastics sheet and printed sheet when bringing the two sheets into contact;

a mangle, the mangle having two spaced apart rollers and means for rotating at least one of the rollers;

feeding means for feeding the plastics sheet and the printed sheet through the rollers to facilitate their adherence, said feeding means including a guard for separating the sheet of printed matter from the plastics sheet prior to combining them between said rollers; and a cutting tool for removing a portion of the cover sheet from the plastics sheet.

2. Apparatus as claimed in claim 1, wherein said tool is T-shaped having a leg member connected and perpendicularly disposed to a head member, said leg member having two parallel cutting edges to enable the tool to be used conveniently by both right and left handed operators.

3. Apparatus as claimed in claim 2, wherein the leg member is at least 220 mm long.

4. Apparatus as claimed in claim 2, wherein the head member has two ends distal from the leg member and two-sides which each extend from one of said ends of the head member to one of said edges of the leg member and which each define a corner with the respective end, wherein said head member includes a cut out portion at each said corner and wherein the head member extends longitudinally from each said edge of the leg member by a distance equal to a predetermined optimum width of the strip to be removed.

5. Apparatus as claimed in claim 2, wherein the head member has two ends distal from the leg member and two sides which each extend from one of said ends of the head member to one of said edges of the leg member, and wherein said head member includes cut out portions located at each of said sides of the head member at a distance from the respective edge of the leg member equivalent to a predetermined optimum width of the strip to be removed.

6. Apparatus as claimed in claim 4 or claim 5, wherein said cut out portion has a profile adapted to provide a pointer means which, when pointed at an upper edge of said sheet, causes the upper cutting edge to be located at a distance from the upper edge equal to the predetermined optimum width of the strip to be removed.

7. Apparatus as claimed in claim 2, wherein said leg member comprises a recessed trough adapted to provide a finger gripping means for the operator when using the tool.

8. Apparatus as claimed in claim 1, wherein said sheet of printed matter contains license or registration details.

9. Apparatus as claimed in claim 1 wherein said at least two respective edges of the plastics sheet and printed sheet abut against said two wall surfaces when bringing the two sheets into contact.

* * * * *